United States Patent Office 3,076,275
Patented Feb. 5, 1963

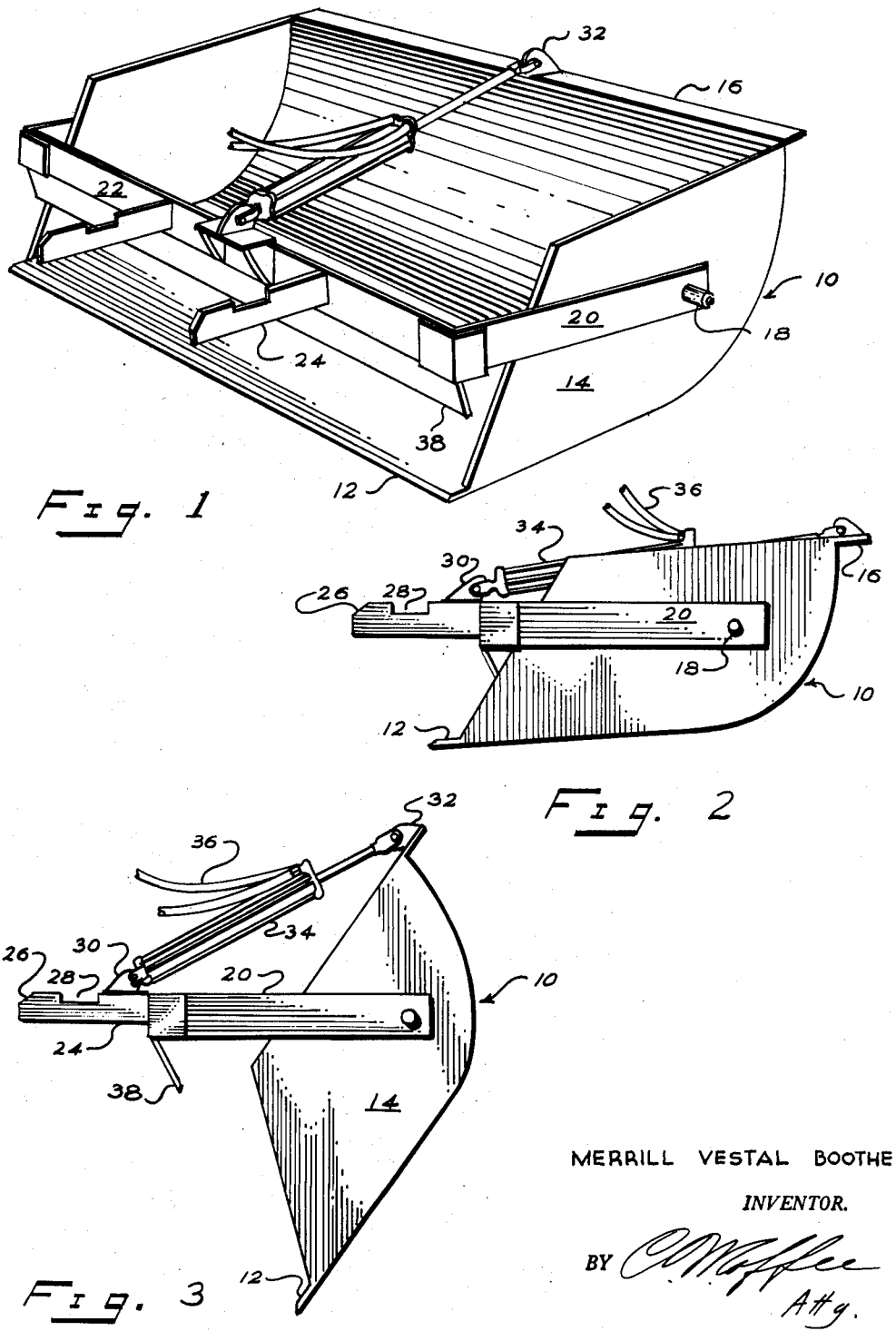

3,076,275
ELEVATING SCRAPER
Merrill Vestal Boothe, 309 34th, Snyder, Tex.
Filed Nov. 28, 1960, Ser. No. 72,228
2 Claims. (Cl. 37—118)

This invention pertains to earth moving equipment and more particularly to a scraper which may be attached to the standard implement attachment of a farm tractor.

In agricultural operation there is often a need for earth moving equipment. With the equipment commercially available today, the farm operator generally has three choices: (1) to rent commercial equipment of this type such as bulldozers attached to track laying tractors; (2) to use front loading scoops which may be attached to the front of a regular farm tractor or, (3) a fresno scraper.

The first alternative is undesirable because of the general high cost, time delay, and unavailability. The second is undesirable because of the expense involved and the time required to attach and disengage the equipment. The third is relatively inexpensive and quickly attached, however, it requires two operators, the tractor driver, and a man on foot.

I have invented a scraper which combines the advantages of all three; i.e., a relatively inexpensive device which can be quickly attached to the standard farm tractor which requires only one person to operate and which can quickly be attached and detached from the tractor.

An object of this invention is to provide a scraper with the advantages defined above.

Another object is to obtain finer control of the scraper.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a perspective view of a scraper according to the invention.

FIG. 2 is a side view of the scraper in the loaded position.

FIG. 3 is a side view of the scraper in the dumping position.

As may be seen in the accompanying drawing the scraper includes a deep shovel or scoop 10, with a forward extending blade 12. The main part of the scoop has vertical side walls 14. The blade extending forward defines the front of the scoop and along the back there is a reinforcing flange 16. Extending outward from each side wall is a stud. The studs may not be seen in the drawing because they are enclosed within cups 18. Each stud journals within a cup. Each cup is rigidly attached to a side bar 20 of the bail. The bail includes two side bars and a cross bar 22. Thus it may be seen that means are provided for pivoting a bail to the scoop.

The cross bar of the bail 22 has two vertical plates 24 extending in front of it. Each plate is beveled at 26 and notched at 28. This is the standard arrangement by which implements are quickly attached to the standard elevating mechanism of ordinary farm tractors. Thus it may be seen that the means are provided on the bail for rigidly attaching the bail to the elevating mechanism of a standard farm tractor.

Ear 30 is attached at the center of the cross bar 22. A second ear 32 is attached to the reinforcing flange 16 in the center thereof. The two ears are interconnected by hydraulic piston-cylinder 34. The piston-cylinder is attached to the ears at both ends by pins as is conventional in the art. Whether the hydraulic piston will be extended as shown in FIG. 2 or retracted as shown in FIG. 3 will depend upon the operation upon the hydraulic pressure existing in lines 36 leading to the piston-cylinder and controlled by the operator.

Flange 38 depends from the cross bar of the bail toward the blade of the scoop. The purpose of this flange is to maintain the earth within the scoop in the loaded position as seen in FIG. 2. After the earth has been moved into the scoop it is contemplated that the scoop will be elevated by the elevating mechanism of the tractor and then the tractor with the loaded scoop will move to a remote point. If the ground is rough and the scoop jostles around there is a tendency for the earth to fall from the scoop however, the flange 38 extending down toward the blade acts as a deterrent to the earth so dropping out. The cross bar 22 is parallel to the blade 12.

It will be noted that the studs journaled within the cups 18 are located somewhat rearwardly of the center of gravity of the scoop. Normally the scoop will tend to rotate to a dump position, as seen in FIG. 3.

It will be apparent that the embodiment shown is only exemplary and various modifications can be made in construction, materials, and arrangement within the scope of the invention as defined in the appended claims.

I claim as my invention:
1. In an elevating scraper having
   (a) a scoop with
   (b) vertical side walls and
   (c) a forward extending blade,
   (d) made to be attached to an ordinary farm tractor having
   (e) a standard elevating mechanism;
   the improvement comprising:
   (f) a bail formed of
   (g) a cross bar rigidly connected to
   (h) two side bars,
   (i) the cross bar parallel to the blade,
   (j) a flange on the cross bar of the bail depending toward the blade,
   (k) each side bar of the bail pivoted to a side wall of the scoop
   (l) rearward of the center of gravity of the loaded scoop,
   (m) a hydraulic piston-cylinder attached between the cross bar of the bail and back to the scoop, and
   (n) two spaced vertical plates attached to the cross bar, extending forward therefrom,
   (o) each plate having a notch in its upper surface,
   (p) said plates being means for rigidly attaching the cross bar to the elevating mechanism of a tractor.
2. In an elevating scraper having
   (a) a scoop with
   (b) vertical side walls and
   (c) a forward extending blade,
   (d) made to be attached to an ordinary farm tractor having

(e) a standard elevating mechanism;
the improvement comprising:
(f) a bail formed of
(g) a cross bar rigidly connected to
(h) two side bars,
(i) the cross bar parallel to the blade,
(j) a flange on the cross bar of the bail depending toward the blade,
(k) each side bar of the bail pivoted to a side wall of the scoop
(l) rearward of the center of gravity of the loaded scoop,
(m) a hydraulic piston-cylinder attached between the cross bar of the bail and back to the scoop, and
(n) means for rigidly attaching the cross bar to the elevating mechanism of a tractor.

References Cited in the file of this patent

UNITED STATES PATENTS

| | | |
|---|---|---|
| 1,924,360 | Harrison | Aug. 29, 1933 |
| 2,389,199 | Laird | Nov. 20, 1945 |
| 2,517,163 | Arps | Aug. 1, 1950 |
| 2,545,739 | Martin | Mar. 20, 1951 |
| 2,582,032 | Harmon et al. | Jan. 8, 1952 |
| 2,874,489 | Orjala | Feb. 24, 1959 |

FOREIGN PATENTS

| | | |
|---|---|---|
| 481,591 | Canada | Mar. 11, 1952 |
| 588,928 | Canada | Dec. 15, 1959 |

OTHER REFERENCES

German application Serial No. H22,994, printed Oct. 25, 1956.